United States Patent
Hartenek

(10) Patent No.: US 10,680,748 B2
(45) Date of Patent: Jun. 9, 2020

(54) METHOD AND A DEVICE FOR AVOIDING ERROR DETECTION OF CONTROL CHANNELS

(71) Applicant: Rohde & Schwarz GmbH & Co. KG, Munich (DE)

(72) Inventor: Moritz Hartenek, Munich (DE)

(73) Assignee: Rohde & Schwarze GmbH & Co. KG, Munich (DE)

( * ) Notice: Subject to any disclaimer, the term of this patent is extended or adjusted under 35 U.S.C. 154(b) by 0 days.

(21) Appl. No.: 14/377,852

(22) PCT Filed: Feb. 14, 2013

(86) PCT No.: PCT/EP2013/052974
§ 371 (c)(1),
(2) Date: Aug. 10, 2014

(87) PCT Pub. No.: WO2013/120953
PCT Pub. Date: Aug. 22, 2013

(65) Prior Publication Data
US 2015/0016275 A1 Jan. 15, 2015

(30) Foreign Application Priority Data
Feb. 17, 2012 (DE) .......... 10 2012 202 482

(51) Int. Cl.
*H04L 1/00* (2006.01)
*H04W 24/08* (2009.01)
(Continued)

(52) U.S. Cl.
CPC .......... *H04L 1/0042* (2013.01); *H04L 1/0038* (2013.01); *H04L 1/0079* (2013.01);
(Continued)

(58) Field of Classification Search
CPC ...................................... H04L 1/0079
See application file for complete search history.

(56) References Cited

U.S. PATENT DOCUMENTS

| | | | |
|---|---|---|---|
| 2009/0088148 A1 | 4/2009 | Chung et al. | |
| 2009/0300464 A1 | 12/2009 | Shiokawa et al. | |

(Continued)

FOREIGN PATENT DOCUMENTS

| | | |
|---|---|---|
| WO | WO2001008438 A1 | 2/2001 |
| WO | WO2010129814 A2 | 11/2010 |
| WO | WO2011076241 A1 | 6/2011 |

OTHER PUBLICATIONS

PCT/EP2013/052974, International Preliminary Report on Patentability (English-translation), dated Aug. 19, 2014.

(Continued)

*Primary Examiner* — John D Blanton
(74) *Attorney, Agent, or Firm* — Potomac Technology Law, LLC

(57) ABSTRACT

In a method for avoiding an error detection of control channels in a mobile-radio device, a transmitter device transmits control signals on control channels which are received and decoded by the mobile-radio device. A control channel contains a bit sequence and a check-value of the bit sequence. In the case of a successful check-value comparison, the mobile-radio device accepts the control channel and otherwise rejects the control channel. A control channel, which has not been allocated to a mobile-radio device is defined with a filler sequence which dedicates in the case of a check-value comparison and always leads to the rejection of the control channel.

8 Claims, 5 Drawing Sheets

(51) Int. Cl.
*H04W 72/04* (2009.01)
*H04W 24/02* (2009.01)

(52) U.S. Cl.
CPC .......... *H04L 1/0091* (2013.01); *H04W 24/08* (2013.01); *H04W 72/042* (2013.01); *H04L 1/0061* (2013.01); *H04L 1/0072* (2013.01); *H04W 24/02* (2013.01)

(56) References Cited

U.S. PATENT DOCUMENTS

| | | |
|---|---|---|
| 2011/0083066 A1 | 4/2011 | Chung et al. |
| 2011/0116428 A1 | 5/2011 | Seong et al. |
| 2011/0171985 A1* | 7/2011 | Papasakellariou .... H04W 72/02 455/509 |
| 2012/0173952 A1* | 7/2012 | Kumar K. ........... H03M 13/091 714/758 |
| 2012/0287880 A1* | 11/2012 | Frederiksen .......... H04L 1/0065 370/329 |

OTHER PUBLICATIONS

3GPP, "Evolved Universal Terrestrial Radio Access (E-UTRA); Medium Access Control (MAC) Protocol Specification", 3GPP TS 36.321, V10.4.0, Dec. 2011, 2011.

3GPP, "Evolved Universal Terrestrial Radio Access (E-UTRA); Physical Layer Procedures", 3GPP TS 36.213, V10.4.0, Dec. 2011, 2011.

Rohde & Schwarz, 3GPP TSG-RAN WG5 Meeting #54, R5-120903r1, Feb. 13, 2012.

* cited by examiner

METHOD AND A DEVICE FOR AVOIDING ERROR DETECTION OF CONTROL CHANNELS

CROSS-REFERENCE TO RELATED APPLICATION(S)

The present application is a national phase application of PCT application No. PCT/EP2013/052974 (filed Feb. 14, 2013), and claims priority to German Patent Application No. DE 102012202482.4 (filed Feb. 17, 2012), the entireties of which are incorporated herein by reference.

FIELD

The invention relates to a method for avoiding an error detection of control channels in a mobile-radio device and a device for generating and transmitting control signals to a mobile-radio device on control channels.

BACKGROUND

In modern wireless networks, such as an LTE- or LTE-A mobile-radio network, the right to transmit, for example, payload data via the control channels in a flexible manner is communicated to a mobile-radio device, so that the bandwidth available in a mobile-radio cell can be used efficiently by many mobile-radio devices with an optimum bandwidth. When a mobile-radio device requests a data connection, a code is allocated to it by a transmitter device within the mobile-radio network. Control messages for this mobile-radio device are then marked with the allocated code and transmitted on a transport channel together with control messages for other mobile-radio devices which are disposed in the same radio cell.

In order to find its own control messages, the mobile device implements so-called blind decodings. Accordingly, the mobile-radio device searches through a so-called "search space" ("search space") of the transport channel, for example, as described in the 3GPP standard TS 36.213, and establishes via a check-value comparison (CRC check), whether the control message is intended for this mobile-radio device. In the LTE specification 3GPP TS 36.212, a check-value length of 16 bits is used, and up to 40 blind decodings per second are implemented.

In order to minimize the number of these blind decodings and to design them as effectively as possible, U.S. 2011/0116428 A1 describes blind decodings of control channels which result in several valid check-values, so that different mobile-radio codes are checked. As a result of the large number of check-value calculations, the number of error detections rises significantly, that is to say, control channels are accepted although they are not intended for the decoding mobile-radio device. This leads to an error transmission of data and accordingly to a deterioration in the transmission quality. In order to reduce the number of error decodings, the control channels are checked with regard to further criteria, such as the number and structure of filler bits. The control channel is accepted only if these are met.

A further source of error detections results from the fact that control channels are transmitted even when no information needs to be transmitted to the mobile-radio device. In this context, the control channel is defined with noise or a random bit sequence. Accordingly, a randomly correct check-value for the random bit sequence can occur with a statistical probability of $2^{-check\text{-}value\ length}$. For example, in the case of a check-value (CRC) length of 16 bits and up to 40 blind decodings per millisecond, 0.6 error detections per hour occur. This also means that the mobile-radio device incorrectly interprets the control channel as an authorization to transmit data and therefore contributes to a disturbance of the channel.

In addition to a general increase in the noise level, such error detections are disturbing in conformity tests. For example, a mobile-radio device is tested for spurious emissions (spurious emissions) in this manner. Error detections in a mobile-radio device and a subsequent transmission of data by the mobile-radio device falsify or disturb such a test procedure.

What is needed, therefore, is an approach for reducing or preventing the number of error detections in a simple manner generating minimal operational loading, for example, in a mobile radio device or a base station in a mobile-radio network.

SUMMARY

Embodiments of the present invention advantageously address the foregoing requirements and needs, as well as others, by providing an approach for reducing or preventing the number of error detections in a simple manner generating minimal operational loading, for example, in a mobile radio device or a base station in a mobile-radio network.

According to example embodiments of the present invention, in a method for avoiding an error detection of control channels in a mobile-radio device, a transmitter device transmits control signals on control channels, which are received by the mobile-radio device and decoded, whereas a control signal of a control channel contains a bit sequence and a check-value of the bit sequence, and, in the case of a successful check-value comparison, the mobile-radio device accepts the control channel and otherwise rejects the control channel. A control channel which is not allocated to a mobile-radio device is defined with a filler sequence, which dedicates in the case of a check-value comparison and always leads to a rejection of the control channel.

Such a filler sequence is therefore already recognized in the case of a check-value comparison and rejected without subsequent processing steps, so that the mobile-radio device and especially the processing unit in the mobile-radio device are not loaded. Moreover, error detections can be avoided and disturbing transmission activities of the mobile-radio device can be prevented in this manner.

By way of example, the entire filler sequence may comprise exclusively zeros. In the case of a standard check-value determination in the mobile-radio device, this filler sequence ensures the rejection of the transmitted bit sequence as incorrect. According to standard, the check-value of the bit sequence is encoded in the transmitter device with the code of the addressed mobile-radio device through an XOR operation. In the context of the decoding in the mobile-radio device, the check-value is decoded through an XOR operation with the code allocated to the mobile-radio device, which must not comprise exclusively zeros. This results in an adjusted check-value, which does not comprise exclusively zeros. However, a bit sequence of exclusively zeros always leads to a check-value identical to zero, so that the check-value comparison inevitably fails.

Accordingly, control channels which are not allocated to a mobile-radio device are prevented from still being accepted by a mobile-radio device in a simple manner. The detection algorithm in the mobile-radio device can be retained without change, so that disturbances resulting from error detections are achieved exclusively by implementing the method in the transmitter device. In the transmitter device, the named filler sequence can be used without additional calculations or complicated logic elements in the control channel and can therefore be realized simply, reliably and in a cost-favorable manner. Already existing transmitter devices can be ungraded by a retrospective implementation of the method.

By way of further example, a control channel contains the filler sequence as a basic definition. This ensures that control channels, which are not allocated to a mobile-radio device lead to error decodings, because, as a result of the filler sequence, these control channels are in a defined status, which does not lead to error detections. Only when control messages for a mobile-radio device are transmitted in the control channel, is the filler sequence defined by the corresponding bit sequence and a check-value of the bit sequence.

According to one example embodiment, the method is used for testing spurious emissions (spurious emissions) of the mobile-radio device. Such a test is especially sensitive to signals transmitted additionally from the mobile-radio device, which are interpreted as spurious emissions and therefore either disturb the test procedure or falsify the test results.

According to example embodiments of the present invention, a device for generating and transmitting control channels to a mobile-radio device comprises an allocation unit which allocates a bit sequence to a region of the control channel and a checking unit which forms a check-value from the bit sequence to be transmitted and appends it to the bit sequence, whereas the allocation unit allocates to a control channel which is not allocated to a mobile-radio device a filler sequence which always leads to a rejection of the control channel in the context of a check-value comparison. Such a device generates and transmits control channels, which cause a mobile-radio device to transmit data only if the latter has actually been addressed. Error detections are completely prevented.

By way of example, the filler sequence may comprise exclusively zeros. The check-value comparison leads to an incorrect result, and the control channel is rejected because such a filler sequence can be formed only by a code of a mobile-radio device which is not used, see 3GPP TS 36.321.

According to one example embodiment, the device is a base station in an LTE- or LTE-A mobile-radio network. If a base station operates corresponding to the device according to the invention, only control channels unambiguously allocated to a mobile-radio device or not allocated are transmitted, and accordingly, error detections and interference or noise of the transmission channel is avoided.

BRIEF DESCRIPTION OF THE DRAWINGS

Various example embodiments of the present invention are described in further detail below with reference to the drawings, wherein identical components are labeled with the same reference numbers, and in which.

DETAILED DESCRIPTION

An approach for reducing or preventing the number of error detections in a simple manner generating minimal operational loading, for example, in a mobile radio device or a base station in a mobile-radio network, is described. In the following description, for the purposes of explanation, numerous specific details are set forth in order to provide a thorough understanding of the invention. It is apparent, however, that embodiments of the invention may be practiced without these specific details or with an equivalent arrangement. In other instances, well known structures and devices are shown in block diagram form in order to avoid unnecessarily obscuring the invention.

Figure 1:
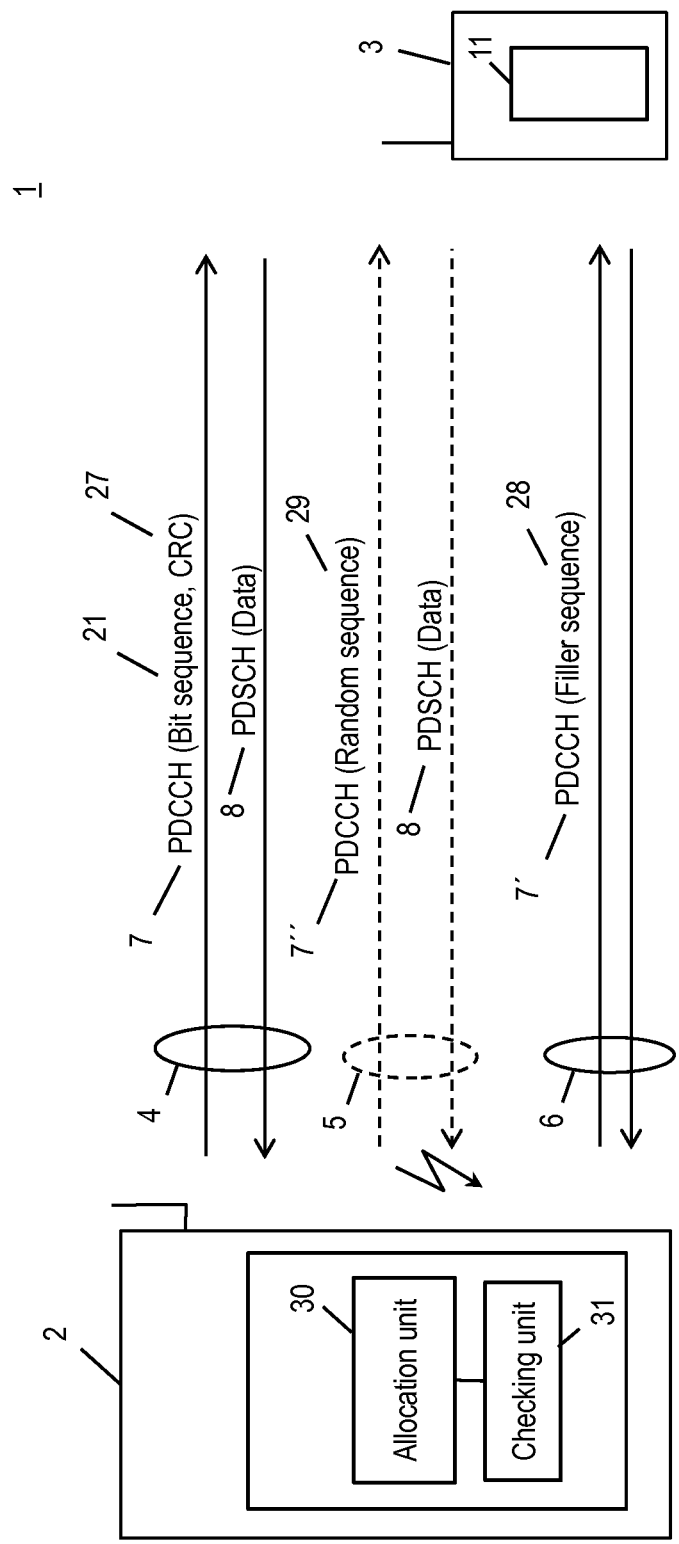
FIG. 1 illustrates a block diagram depicting a transmitter device, and communications processes between a transmitter device and a mobile-radio device, wherein a communications process in accordance with example embodiments of the present invention are compared with a communications process according to the prior art.

FIG. 1 shows a transmitter device 2 which exchanges control channels 7, 7' and payload channels 8 with a mobile-radio device 3. Within the communication process 4, the transmitter device 2 transmits a control channel 7, in this case, for example, a physical downlink control channel (packet data control channel, PDCCH), which contains control information for the mobile-radio device 3.

This control information is contained as a bit sequence 21 of the control signal in the control channel 7. A check-value 27, which is formed, for example, by a cyclical-redundancy check of the bit sequence 21 and encoded with a code of the mobile-radio device, is appended to the bit sequence 21. The control channel 7 is received by the mobile-radio device 3. A check-value comparison is now implemented in a detection routine 11. In this context, the mobile-radio device 2 decodes the check-value 27 with its own code and implements a redundancy check with the received bit sequence 21 and the determined check-value. If this is successful, the check-value comparison is successful, and the control channel is recognized as intended for the mobile-radio device and further evaluated. In response to the control channel 7, the mobile-radio device 3 transmits, for example, data to the transmitter device 2, in a data channel 8 (Physical Downlink Shared Channel, PDSCH).

In the communications process 5, the transmission of a control channel 7" which is not allocated to a mobile-radio device is illustrated, as specified in the prior art. In this context, the control channel 7" is defined with a random sequence 29. With a probability of 2-check-value length, the bits of the random sequence which are disposed at the position of the check-value correspond to the check-value of the preceding bit sequence of the random sequence. If this is the case, the control channel 7" is incorrectly accepted by the mobile-radio device 3, and the mobile-radio device 3 transmits, for example, a control signal to the transmitter device 2 on a data channel 8. A data channel 8 is not expected by the mobile-radio device 3 there, and accordingly, the data packet is rejected.

In order to avoid an error detection of this kind, in a transmitter device 2, according to example embodiments of the invention, a control channel 7', which is not allocated to a mobile-radio device, is defined with a filler sequence 28 by a generation process 10, see communications process 6. If the mobile-radio device 3 receives such a control channel 7', the check-value comparison fails, and the control channel 7' is rejected. No data channel is transmitted to the transmitter device 2.

The transmitter device 2 comprises an allocation unit 30, which allocates to the control channel 7 either a bit sequence 21 for a mobile-radio device 2 or a filler sequence 28, if the control channel 7' does not contain a message for a mobile-radio device. If the bit sequence has been allocated to the control channel 7, a checking unit 31 determines the check-value 27 of the bit sequence 21 and adds this to the bit sequence 21.

Figure 2:
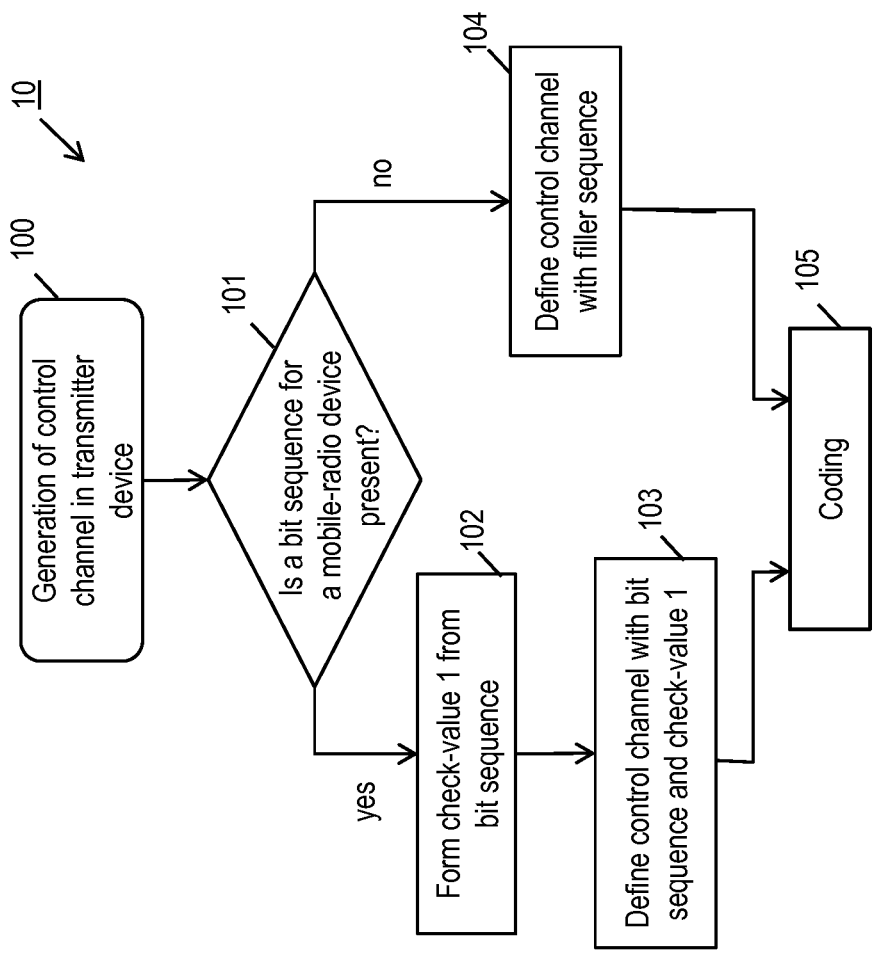
FIG. 2 illustrates a flow chart depicting a method implemented in the transmission device, in accordance with example embodiments of the present invention.

FIG. 2 now shows the method steps of the generation process 10 which are implemented in the transmitter device 2. In generating a control channel in the transmitter device, from starting point 100, a check is carried out, in a first method step 101, regarding whether bit sequences for a mobile-radio device are present. If this is the case, a check-value 1 is formed from the bit sequence, in method step 102. Following this, in step 103, the control channel with the bit sequence and the check-value 1 appended to it is defined and routed for further coding, in step 105, and subsequent transmission.

If it is determined, in method step 101, that no bit sequence for a mobile-radio device is present, the control channel is defined with a filler sequence, see method step 104. This control channel is also routed for further coding in method step 105, and subsequently transmitted by the transmitter device.

Figure 3:
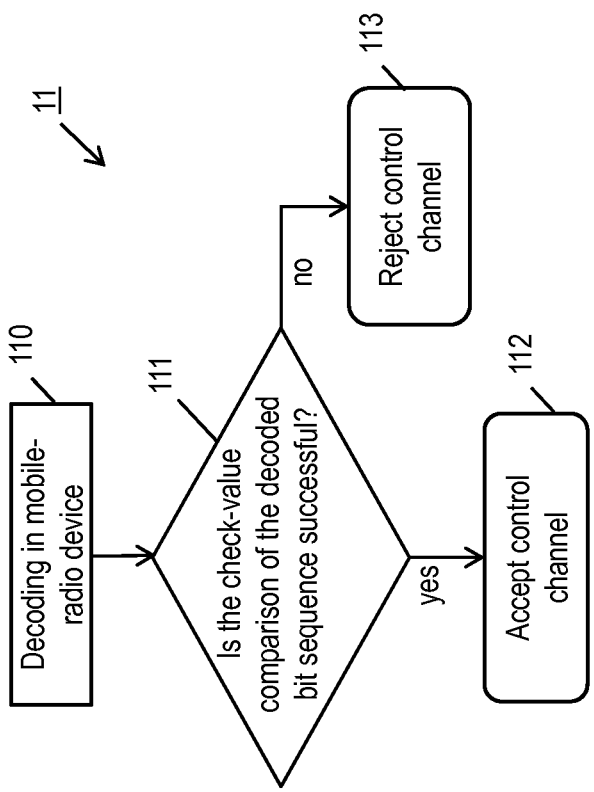
FIG. 3 illustrates a flow chart depicting the method implemented in the mobile-radio device, in accordance with example embodiments of the present invention.

FIG. 3 shows the detection routine 11 which is run through in the mobile-radio device 3 when a control channel is received. In method step 100, the control channel is decoded in the mobile-radio device, and the check-value is determined. With the check-value, the bit sequence or the remaining bits of the filler sequence are tested, or a cyclical redundancy check is implemented. In method step 111, in the case of a successful redundancy check and accordingly a positive check-value comparison, the control information is then accepted, in method step 112. If the result of the check comparison in step in 11 is negative, the control channel is rejected.

Figure 4:
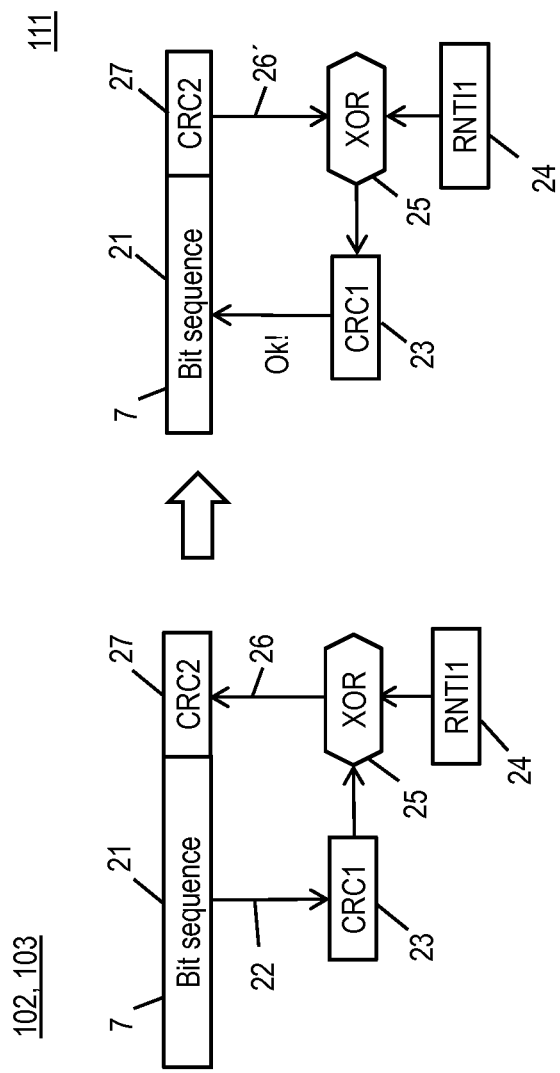
FIG. 4 illustrates a schematic presentation depicting a conventional check-value formation in a transmission device and a check-value comparison in a mobile-radio device with a control channel which is intended for a mobile-radio device.

FIG. 4, left-hand side, shows how the check-value is generated from the bit sequence and appended, in method step 102, see FIG. 2. In this context, for example, a cyclical redundancy check is implemented in the form of a polynomial division or an XOR operation on a bit sequence 21, see arrow 22, and a check-value 23 is determined from this. In an LTE mobile-radio device, this check-value 23 is encoded in accordance with 3GPP TS 36.212 through an XOR operation 25 with a code of the mobile-radio device (RNTI1) 24, for which the message is intended. The check-value 27 generated in this manner is now appended to the bit sequence and transmitted as a control channel 7. In the receiving mobile-radio device 2, the check-value comparison 111, illustrated on the right-hand side, is now implemented. In this context, the appended check-value 27 is extracted 26' and decoded in an inverse calculation, once again an XOR operation 25 with the code 24 which was allocated to the device and agrees with the code 24 inserted in the process 102. The subsequent redundancy check or respectively the check-value comparison of the bit sequence 21 with the resulting check-value 23 leads to a positive result, and the control channel is accepted, and the bit sequence is further processed.

Figure 5:
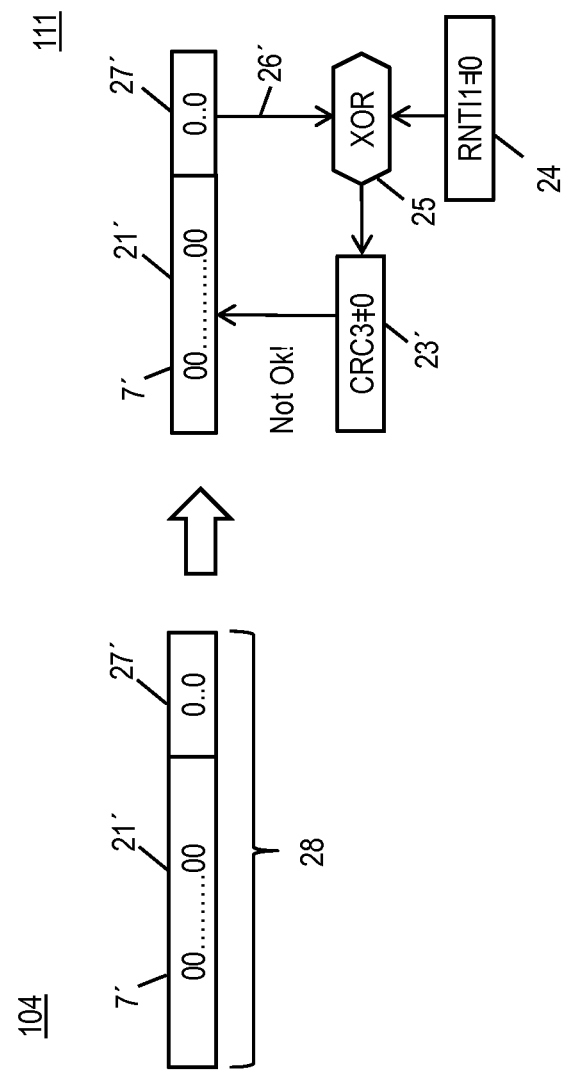
FIG. 5 illustrates a schematic presentation depicting a generation and decoding of a control channel without a mobile-radio device allocation, in accordance with example embodiments of the present invention.

FIG. 5, left-hand side, now shows a control channel 7' with a filler sequence 28, as illustrated in step 104 in FIG. 2. The filler sequence 28 here is a pure zero sequence, which provides exclusively zeros as the check-value 27', which always have a fixed, predetermined length, for example 16 bits. The remaining bits 21' of the filler sequence 28 also comprise exclusively zeros. These were inserted in the transmitter device 2 into a control channel which was not allocated to a mobile-radio device. In the mobile-radio device 3, the check-value comparison 111 is now implemented. Corresponding to the process 111 in FIG. 4, the of the check-value 27' are also extracted here, see arrow 26', and decoded with the code 24 allocated to the mobile-radio device 3 in an XOR operation 25. The resulting check-value 23' provides a value different from zero, because, in an LTE mobile-radio network, the code 24 must never have a value identical to zero. That is to say, the check-value 23 does not comprise exclusively zeros. If a cyclical-redundancy check of the bit sequence 21' is now implemented with this check-value 23', this leads to a negative result, since a bit sequence 21' comprising exclusively zeros leads to a positive result only with a check-value identical to zero.

All of the features described and/or illustrated can be advantageously combined with one another within the framework of the invention. The invention is not restricted to the exemplary embodiments described. For example, appropriate filler sequences 28 differing from a pure sequence of zeros are conceivable. It is intended that the scope of the invention be defined by the claims appended hereto.

The invention claimed is:

1. A method comprising:
    generating a control channel signal based on a final check-value appended to a control channel data sequence, wherein (i) when a bit sequence is present for a mobile radio device, the control channel data sequence is based on the bit sequence and the final check-value is generated based on a check-value of the bit sequence, and (ii) when the bit sequence is not present for the mobile radio device, the control channel data sequence and the final check-value are based on a filler data sequence;
    transmitting the control channel signal to the mobile radio device over a control channel of a wireless communications network; and
    receiving, by the mobile radio device, the transmitted control channel signal, decoding the final check-value based on a code allocated to the mobile radio device, and performing a check-value evaluation based on the decoded final check-value; and
    wherein the filler data sequence is not all zeros, and is configured such that the decoding of the final check-value based on the code allocated to the mobile radio device will provide a non-zero result and the check-value evaluation will correspondingly lead to a negative result,
    wherein, when the final check-value was generated based on the check-value of the bit sequence, the check-value evaluation leads to a positive result and the mobile radio device accepts the control channel signal,
    wherein, when the control channel data sequence and the final check-value are based on the filler data sequence, the decoding of the final check-value based on the code allocated to the mobile radio device provides a non-zero result, and the check-value evaluation leads to a negative result and the mobile radio device rejects the control channel signal.

2. The method according to claim 1, wherein the filler data sequence comprises only zeros.

3. The method according to claim 1, wherein the control channel data sequence comprises the filler data sequence as a basic definition.

4. The method according to claim 1, wherein the method is used for testing spurious emissions of the mobile-radio device.

5. A system, comprising:
a transmission device; and
a mobile radio device; and
wherein the transmission device includes: a processor configured to generate a control channel signal based on a final check-value appended to a control channel data sequence, wherein (i) when a bit sequence is present for the mobile radio device, the control channel data sequence is based on the bit sequence and the final check-value is generated based on a check-value of the bit sequence, and (ii) when the bit sequence is not present for the mobile radio device, the control channel data sequence and the final check-value are based on a filler data sequence; and a transmitter configured to transmit the control channel signal to the mobile radio device over a control channel of a wireless communications network,
wherein the mobile radio device includes: a receiver configured to receive the transmitted control channel signal; and a processor configured to decode the final check-value based on a code allocated to the mobile radio device, and to perform a check-value evaluation based on the decoded final check-value,
wherein the filler data sequence is not all zeros, and is configured such that the decoding of the final check-value based on the code allocated to the mobile radio device will provide a non-zero result and the check-value evaluation will correspondingly lead to a negative result,
wherein, when the final check-value is generated based on the check-value of the bit sequence, the check-value evaluation leads to a positive result, in which case the processor of the mobile radio device is configured to accept the control channel signal, and
wherein, when the control channel data sequence and the final check-value are based on the filler data sequence, the decoding of the final check-value based on the code allocated to the mobile radio device provides a non-zero result and the check-value evaluation leads to a negative result, in which case the processor of the mobile radio device is configured to reject the control channel signal.

6. The system according to claim 5, wherein the filler data sequence comprises only zeros.

7. The system according to claim 5, wherein the system is used for testing spurious emissions of the mobile radio device.

8. The system according to claim 5, wherein the transmission device is used for a base station, and the wireless communications network comprises one of an LTE or an LTE-A mobile-radio network.

* * * * *